March 26, 1968 S. N. FONER ETAL 3,374,661
ADMITTANCE MEASUREMENTS OF SOLID PROPELLANTS
Filed Jan. 28, 1965 2 Sheets-Sheet 1

INVENTORS
SAMUEL N. FONER
RICHARD L. HUDSON
BY Claude Funkhouser
ATTORNEY
Lawrence A. Hoffman
AGENT United States Patent Office 3,374,661
Patented Mar. 26, 1968

3,374,661
ADMITTANCE MEASUREMENTS OF
SOLID PROPELLANTS
Samuel N. Foner, Adelphi, and Richard L. Hudson, Silver Spring, Md., assignors to the United States of America as represented by the Secretary of the Navy
Filed Jan. 28, 1965, Ser. No. 428,885
24 Claims. (Cl. 73—35)

ABSTRACT OF THE DISCLOSURE

A method and apparatus for determining the response of a burning solid propellant surface wherein a propellant is arranged at one end of a centrally vented cavity and a phase-locked mechanical driver for exciting the cavity in a resonant mode is arranged at the other end. The bandwidth of resonance of the system is determined by phase modulating the mechanical driver and measuring the resultant sideband amplitudes, and the decay constant of the cavity used in the system is measured by momentarily shorting out the mechanical drive system and observing the free-decay or growth of oscillations.

The present invention relates to the testing of time-varying systems, and more particularly to an improved method and apparatus for determining the properties of such systems. The invention finds particular utility in the measurement of the acoustic admittance of a burning solid propellant in order to assess the stability thereof.

The acoustic response of the surface of a burning propellant is known to play a dominant role in determining whether a solid propellant rocket motor will be stable or unstable. It has been established that the major source of acoustic amplification is the burning propellant's surface. The other acoustic sources and sinks such as visco-elastic losses in the solid propellant, damping by product gases, particle damping, wall damping, nozzle losses, and the conversion of flow energy to mechanical energy can be analyzed and their effect predicted with moderate accuracy. The amplification properties of the burning surface as characterized by its specific acoustic admittance, however, are not so readily amenable to calculation. For this reason, one of the major goals of the experimental programs on propellant combustion instability has been the measurement of the acoustic admittance of the burning surface.

If a propellant is sufficiently unstable, it can produce self-excited oscillation in combustion chambers and from the rates of growth and decay of these oscillations, it is possible, on the assumption that the acoustic damping is the same during the growth and decay periods, to calculate the acoustic admittance of the burning surface. This method has been applied to unstable propellant systems with considerable success.

However, for the designer of practical solid propellant rocket motors, the study of stable or marginally stable propellant systems is of primary interest, since he probably would not knowingly incorporate an unstable propellant in a motor. A method and apparatus for determination of the acoustic properties of such systems have heretofore been unavailable and, therefore, the assessment of the margin of stability of solid propellants is very difficult. The availability of a technique to suitably measure the acoustic properties of such stable or marginally stable systems is, of course, quite desirable since some minor design change might lead to instability.

The difficulty that is encountered when one attempts to make such measurements in a straightforward manner is that the system has parameters which are rapidly time-varying. This means that if, at a given time, the system possesses a particular resonant frequency, it is not possible to vary frequency of excitation of the system manually and to determine the response of the resonant system, since by the time such manual manipulations are made the resonant frequency of the system will have changed. Therefore, even after the postulation of a mathematical model for the system in question which will permit the translation of measurable physical quantities into the acoustic properties of interest, it is still necessary to devise some method by which the system can be excited at its instantaneous resonant frequency in spite of the rapidly time varying nature thereof.

The problem is, of course, of substantial generality, and a solution in the above particular case is applicable to any oscillatory system, either mechanical or electrical, which possesses time varying characteristics which must be measured rapidly and with great accuracy.

Accordingly, it is an object of the present invention to provide a method and apparatus to determine the margin of stability of solid propellant rocket fuels.

It is a further object of the present invention to provide a method and apparatus for the determination of the acoustic admittance of a burning solid propellant surface.

It is a further object of the present invention to provide a method and apparatus for the accurate determination of the resonant properties of oscillating systems in general.

It is a further object of the present invention to provide a method and apparatus for the rapid and accurate determination of the properties of a wide variety of physical systems possessing time varying characteristics.

The present invention accomplishes the above enumerated objects by the use of an external source of energy to excite oscillations in the system, means to measure the response of the oscillating system, and a novel phase-locked oscillator control system to vary the frequency at which the oscillating system is driven. The exact nature of this invention as well as other objects and advantages thereof will be readily apparent for consideration of the following specification relating to the annexed drawings in which.

Figure 1:
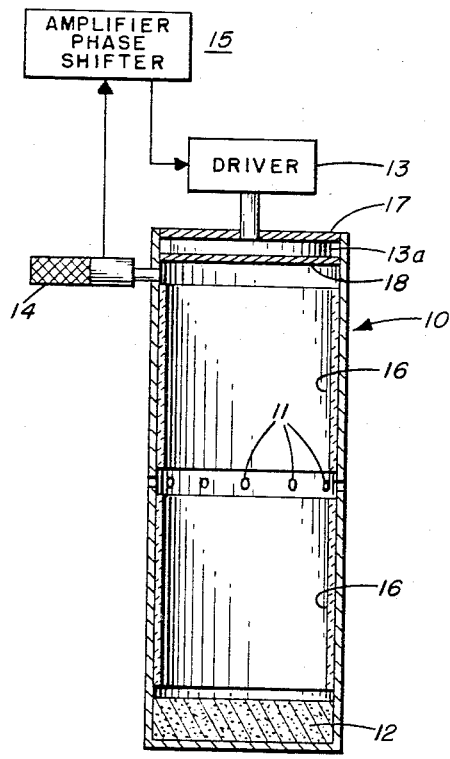
FIG. 1 is a simplified schematic diagram of a system for measuring the acoustic response of a solid propellant.

A simplified schematic diagram of the apparatus is shown in FIG. 1. A suitable chamber 10 having therein a circumferential ring of exhaust holes 11, provides a centrally vented cavity within which the propellant under test is burned. The cavity has disposed therein at one end the propellant specimen 12, and at the other end, a driver 13 connected to a piston 13a and a suitable microphone 14. Suitable electronic equipment 15 is provided to control driver 13 and to receive and analyze signals from microphone 14 indicative of the acoustic pressure in the cavity. A particular structure suitable for use as chamber 10 may comprise a steel pipe of 2 inch interior diameter having a ¼ inch wall, and being 20 inches in length, closed at the end and having one or more rows of 1/16″ diameter holes to vent the burning propellant gases. The interior walls of the pipe may be lined with a suitable refractory material 16 to reduce cooling by the walls. The row of exhaust holes 11 may be replaced by suitable slots or other configurations if desired.

Thin stainless steel diaphragms 17 and 18 seal the top of the cavity against gas leakage and transmit the driver motion to the interior of chamber 10 by means of piston 13a.

Figure 2:
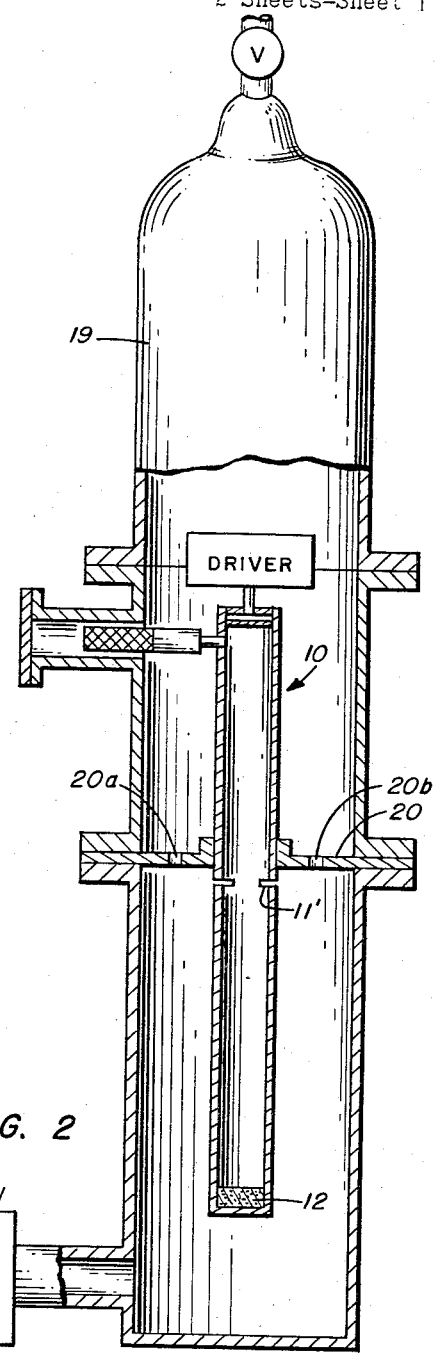
FIG. 2 shows a practical system embodying the concept of FIG. 1.

FIG. 2 shows a suitable installation for the testing of solid propellants according to the concept of FIG. 1. Chamber 10 is mounted vertically inside a suitable pressure vessel 19 with the burning propellant 12 at the lower end. Exhaust slots 11' replace the circumferential ring of holes 11. A suitable structure 20 supports the chamber 10. Vents 20a and 20b provide pressure equalization above and below the support. Ballast tank 21 is provided to increase the total volume of the system and to limit the overall pressure rise produced by the burning propellant. A suitable system may have a total volume of about 12 cubic feet and be pressurized to approximately 200 p.s.i. with super dry nitrogen. When the propellant is burned, there is a large temperature asymmetry between the two halves of the cavity. Therefore, in order to position the exhaust slots 11' approximately at the nodal plane for pressure asymmetric axial modes during burning, chamber 10 may be suitably extended at its lower end, although the resulting placement of the exhaust slots asymmetrically with respect to the length of chamber 10 results in a substantial decrease of the Q of the resonance of the cavity when the temperature is uniform.

For any resonant system such as those shown in FIGS. 1 and 2, the decay constant $\alpha$, bandwidth $\Delta f$ and Q for a resonance at frequency $f$ are related by $$\alpha = \frac{\pi f}{Q} = \pi \Delta f \qquad (1)$$

so that any one of these parameters can be used to describe the response for a stable system. In the case of a self-excited oscillator the use of bandwidth and Q are inappropriate and the system response is characterized by a growth constant (negative $\alpha$).

If the decay constant for the cavity with burning propellant is $\alpha$ and the decay constant without propellant but with all other conditions the same is $\alpha D$, then the real part of the specific acoustic admittance Y for a single ended propellant system is given by $$Y = \frac{L}{Pc^2}(\alpha - \alpha D)$$

where L is the cavity length, P is the gas density and $c$ is the velocity of sound; and the real part of the reduced specific acoustic admittance $$Y = -Y\frac{\bar{P}}{\bar{V}}$$

is given by $$Y = -\frac{\bar{P}L}{Psrc^2}(\alpha - \alpha D) \qquad (2)$$

where $\bar{V}$ is the mean flow velocity of the gases, $\bar{P}$ is the mean chamber pressure, Ps is the density of the propellant, and $r$ is the linear burning rate of the propellant. In principle, it is desired that $\alpha$ and $\alpha D$ should be measured simultaneously, a requirement which can hardly be satisfied in a practical apparatus. What can be done, however, is to measure the damping constant at the time of propellant burnout, when the gas flow conditions have changed materially from those existing during the burning period. The conversion of mechanical energy of flow into acoustical energy when the propellant is burning has been shown to introduce a correction term equal to $1/\gamma$, where $$\gamma = \frac{Cp}{Cv}$$

the ratio of the specific heats of the gas in the measurement of y so that $$y + \frac{1}{\gamma} = -\frac{\bar{P}L}{Psrc^2}(\alpha - \alpha'_D)$$

where $\alpha'_D$ is the decay constant at burnout when the mean gas flow has ceased. Since $$y = \frac{\mu}{\epsilon} - \frac{1}{\gamma}$$

this means that in such an experiment one would actually be measuring the real part of the propellant response function, $\mu/\epsilon$ (the fractional increase in burning rate to the fractional increase in acoustic pressure) by $$\frac{\mu}{\epsilon} = -\frac{\bar{P}L}{Psrc^2}(\alpha - \alpha'_D) \qquad (3)$$

It is usually assumed that the cavity damping remains unchanged throughout a run so that the measurement of the damping constant at burnout, can be applied to earlier parts of the run.

Figure 3:
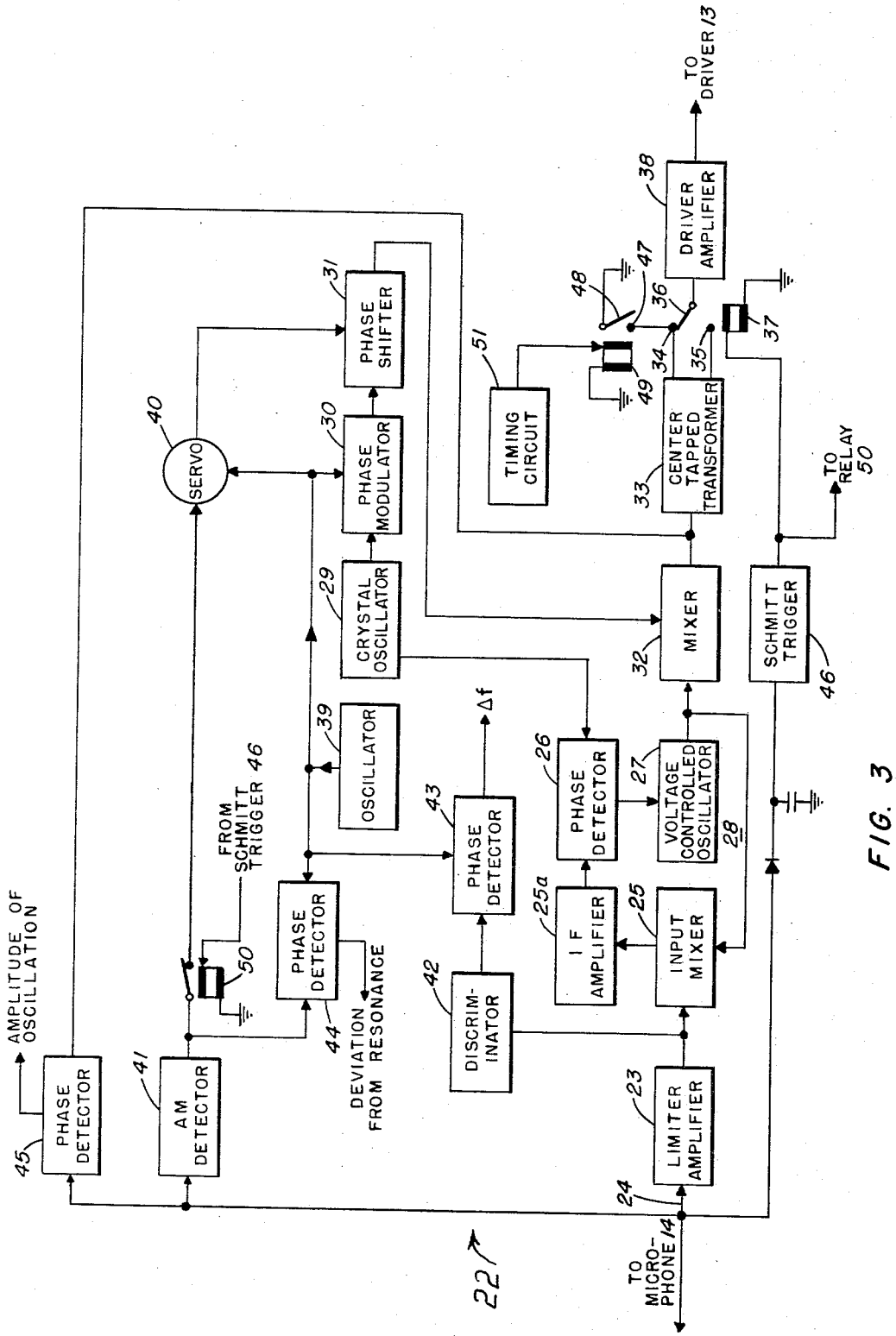
FIG. 3 is a block diagram of suitable electronic circuitry for controlling the frequency of excitation of the systems of FIGS. 1 or 2, and for measuring the response thereof.

In order to measure the response of the cavity, the system of FIG. 3 is employed. The audio cavity containing the propellant serves as the frequency determining element of a phase-locked audio oscillator system 22. As previously noted, this system is capable of following rapid changes in frequency such as occur following propellant ignition or burn-out.

As shown, signals representative of the instantaneous pressure in the cavity are provided by microphone 14 to limiter-amplifier 23 over lead 24. An input mixer 25 which is connected through IF amplifier 25a to a phase detector 26, the output of which controls voltage controlled oscillator 27. The voltage controlled oscillator is arranged to provide a signal differing in frequency by a fixed amount from that of the signal on lead 24. Control of the voltage controlled oscillator is accomplished by a crystal oscillator 29 which provides a signal equal in frequency to the frequency shift to be introduced, and by a feed-back loop 28.

More particularly, assume that the input to mixer 25 contains as a principal frequency $f$, and that the output of voltage controlled oscillator 27 contains (assuming sufficiently narrow bandwidth in the components) only a frequency $f_2 = f + f'$. Thus if $f = f_1$, feedback loop 28 will cause the output of mixer 25 to contain a frequency $f_3 = f_2 - f = f'$. This signal is provided to phase detector 26 for comparison with the output of crystal oscillator 29 in well known fashion. Therefore, it may be seen that if in fact the output of mixer 25 is substantially comprised of $f_3 = f'$, then the output of phase detector 26 will be zero, indicating a phase correspondence between $f_3$ and $f'$.

Now, if $f$ suddenly changes to a value $f_1 + f_1'$ the mixer output will be $f_3 = f_2 - f = f' + f_1'$. Therefore, upon comparison by phase detector 26, a phase difference between $f'$ and $f' + f_1'$ will be found. The output of the detector will no longer be zero, and the output of voltage controlled oscillator 27 will be appropriately shifted to maintain $f_3 = f'$ in spite of any variation of the frequency $f$. Crystal oscillator 29 is also connected through phase modulator 30 and phase shifter 31 to a mixer 32. The output of voltage controlled oscillator 27 is also provided to mixer 32 whereby (ignoring for the moment the modulation and phase shift introduced by phase modulator 30 and phase shifter 31) the signal appearing at the output of mixer 32 is comprised of a frequency $$F = f_2 - f' = f + f' - f' = f$$

i.e., a regenerated version of the signal provided on lead 24 from the microphone. An arrangement such as described above is commonly known as a phase-locked or tracking filter and serves to eliminate extraneous signals from the filter input. The output of mixer 32 is provided to center-tapped transformer 33 and then through either contact 34 or 35 and arm 36 of relay 37, to a suitable amplifier 38. The output of amplifier 38 is provided to driver 13 to excite the system at the desired frequency.

As indicated by Equation 1, measurement of the decay constant or bandwidth are made while the cavity is oscillating at its resonant frequency. However, for systems of the present type with both the resonant frequency and the bandwidth rapidly varying, the frequency dependent nature of each component in the feedback loop assumes an added criticality.

For example, consider the closed loop comprising the cavity, the tracking filter, the microphone, the driver, and any other circuit elements which may be frequency dependent. At resonance, the cavity will provide no phase shift, this being the constraint imposed by the definition of resonance. The driver, microphone and other circuit elements each adds a phase shift determined by its own phase response at that particular frequency. On the other hand, a phase locked filter is designed to track its input with no phase shift.

Therefore, the closed nature of the oscillating system imposes the requirement that if there are any phase shifts around the loop which do not exactly cancel out, the cavity will be forced to adjust itself (since it is the only variable phase shift in the loop) to cancel out whatever phase shift remains and, therefore, it will no longer be oscillating at its resonant frequency.

The difficulties are increased by the fact that the resonant frequency of the cavity is itself varying, and therefore the miscellaneous phase shift around the loop will not be constant since in general the phase shift introduced by each element varies with frequency.

These problems are overcome in the present invention by the modification of a conventional phase-locked filter (which would comprise mixer 25, amplifier 25a, detector 26, voltage controlled oscillator 27, mixer 32, and crystal oscillator 29), to include a phase modulator 30 and a phase shifter 31 between the crystal oscillator 29 and mixer 32 for the purpose of tracking the varying phase shift in the loop. This means that the tracking filter, instead of providing zero phase shift, will exactly compensate for any extraneous phase shifts in the loop, allowing the cavity to produce zero phase shift, and thus allowing it to resonate.

To this end, a low frequency oscillator 39 provides a signal of frequency $F_m$ which phase modulates the output of crystal oscillator 29. The output of phase modulator 30 is fed to phase shifter 31 which introduces a phase shift $\theta$ into the signal fed to mixer 32. Phase shifter 31 is controlled by a two-phase servo 40 which is driven by low frequency oscillator 39 and by amplitude detector 41, which responds to any amplitude modulation in the microphone output to change the phase of the phase modulated crystal oscillator signal.

As indicated, the output of phase shifter 31 is provided to mixer 32 so that the output of the mixer is phase modulated, the voltage having the form $$V = V_0 \sin[2\pi Ft + \Delta\phi \sin(2\pi F_m t + \theta)]$$

with a corresponding maximum range of instantaneous frequencies of $$F \pm F_m(\Delta\phi)$$

where F is the carrier frequency, $\Delta\phi$ is the maximum phase deviation, and $\theta$ is the phase angle introduced by the phase shifter 31. For low modulation indices, it is an excellent approximation to represent the frequency content of the signal V as the sum of a carrier frequency F and two side band signals at frequencies $F \pm F_m$.

Assuming that the frequency F is exactly the resonant frequency of the cavity, then the side band signals will be of equal amplitude in the microphone output. However, if frequency F is not the resonant frequency of the cavity, then the side band signals will not fall symmetrically on the resonance curve and the microphone output will contain an amplitude modulation component which is detected by amplitude modulation detector 41. The output of AM detector 41 drives the servo 40 to vary the phase angle $\theta$ until the cavity is being driven exactly at its resonant frequency.

The bandwidth $\Delta F$ is detected by discriminator 42 which measures the amplitude of the side bands at $F \pm F_m$. Since the resonant cavity has the property of reducing the amplitude of the sidebands by the factor $\Delta f / 2 F_m$, direct measurement can be provided by comparison of output discriminator 42 with the output of oscillator 39 by a suitable detector 43. Similarly, comparison of the output of oscillator 39 with the output of the AM detector 41 by a suitable detector 44 will provide a direct reading of the sense of the deviation from resonance.

Another phase detector 45 compares the signal from the microphone with the signal used to drive the cavity, and thus gives a direct reading of the amplitude of the oscillation within the cavity, i.e., the acoustic pressure.

Schmitt trigger 46, relay 37, and center tapped transformer 33 are used to permit the analysis of unstable propellants, or for that matter, of any time-varying unstable system. Under normal conditions, amplifier 38 is driven by the positive output of center tapped transformer 33 through contact 34 and arm 36 of relay 37. However, when oscillations in the cavity exceed a predetermined amplitude, Schmitt trigger 46 is used to activate relay 37 to connect arm 36 to contact 35 to reverse the phase of the driver and also change the amplitude of the driving signal. When the amplitude is driven down by the reverse phase signal to another pre-determined value, the Schmitt trigger reverses the relay position and again allows the amplitude to increase.

The positive output of transformer 33 appearing at contact 34 and relay 37 may be shorted to ground through contact 47 and arm 48 of relay 49 in order to study the force-free characteristics of the oscillating system, and to measure the damping constant. However, during the reverse phase operation in unstable systems, it may be seen that the driving signal cannot be shorted out in order to avoid the possibility of the cavity oscillation getting out of control during this period. In addition, the output of Schmitt trigger 46 is provided to relay 50 to prevent the operation of phase shift servo 40 during reverse phase operation.

In the case of stable propellants, a free-decay method of measuring system damping may be used. Assume the system has an equilibrium amplitude of oscillation $P_0$. The drive is shorted out by relay 49 and timing circuit 51 for a time interval $t_1$ during which the amplitude drops to $P_1$, and then the driver is switched back on. The decay constant $\alpha$ is given in this case by $$\alpha = \frac{1}{t_1} \ln \frac{P_0}{P_1} \qquad (4)$$

In the case of unstable propellants an amplitude limiting system may be used to obtain the value of the growth constant. Consider a system which is being cycled between the pressure levels $P_1$ and $P_2$ by 180° phase shifting of the driver 38 and center tapped transformer 33. The equations describing the pressure amplitude are:

$$\frac{dP}{dt} = -P\alpha + D_1 \qquad (5)$$

for the increasing mode ($t_1$), and $$\frac{dP}{dt} = -P\alpha - D_2 \qquad (6)$$

for the decreasing mode ($t_2$), where $\alpha$ is the growth constant and $D_1$ and $D_2$ are, respectively, the driver levels at 0° phase shift, and ±180° phase shift. The solutions of Equations 5 and 6 are, respectively $$P = \left(P_1 - \frac{D_1}{\alpha}\right)e^{-\alpha t} + \frac{D_1}{\alpha}$$

and $$P = \left(P_2 + \frac{D_2}{\alpha}\right)e^{-\alpha t} - \frac{D_2}{\alpha}$$

where $t$ in each case is measured from the instant at which driver switching occurs. In terms of the known parameters $$\frac{D_2}{D_1} = k_1 \quad \frac{P_2}{P_1} = k_2$$

and the measured growth and decay times $t_1$ and $t_2$, we obtain $$(k_1+1)e^{-\alpha t_1} - (k_2+k_1)e^{(-\alpha(t_1+t_2))} + k_2(k_1+1)e^{-\alpha t_2} = 1 + k_1 k_2$$

as an equation for the determination of $\alpha$. Solutions of this exponential equation are readily obtained by an iterative procedure.

It should be remembered that the embodiments of FIGS. 1 through 3 are intended to be exemplary only, and that a wide variety of modifications can be made within the scope of the invention.

For example, a variety of modifications can be made in the structure of chamber 10 in order to accommodate either different shaped propellant charges, or other physical systems requiring the use of a cavity. Similarly, the mounting arrangement and pressure chamber of FIG. 2 need not be limited to those shown since in general the analysis of the physical properties of an oscillating system will not require the use of a pressure chamber. Again, the electronic system of FIG. 3 is intended to be useful for the measurement of a wide variety of systems and both driver 13 and microphone 14 may be replaced by any suitable means to couple energy into and out of the particular physical system under test. Finally, of course, the particular configuration of the electronic circuitry of FIG. 3 is subject to a wide variety of modifications within the scope of the present invention.

What is claimed is:
1. The method of determining the stability of a solid rocket propellant which comprises:
   burning the propellant in a chamber;
   introducing into the chamber an acoustic pressure driving wave having as a principal frequency component thereof the resonant frequency of the chamber;
   measuring the damping constant of the resonance of the chamber, and the instantaneous acoustic pressure in the chamber; and
   determining the specific admittance of the burning propellant surface from the quantities measured, the acoustic admittance providing an indication of the stability of the solid propellant.

2. The method of claim 1 where the damping constant is measured by
   removing for a predetermined time period the acoustic pressure wave being introduced into the chamber;
   observing the force free characteristics of the pressure wave in the chamber; and
   calculating the decay constant $\alpha$ according to the relationship:

$$\alpha = \frac{1}{t_1} \ln \frac{P_0}{P_1}$$

where $t_1$ is the length of the predetermined time period $P_0$ is the chamber pressure at the time the input pressure wave is removed, and $P_1$ is the chamber pressure at a time $t_1$ later.

3. The method of claim 1 where $\alpha$ is measured by introducing into the chamber sideband signals at frequencies $F \pm F_m$, where F is the frequency of the driving wave;
   comparing the amplitudes of the sideband frequencies in the chamber pressure wave with those of the signal introduced; and
   determining the band width $\Delta f$ from the fact that the ratios of the cavity pressure to the input pressure at frequencies $F \pm F_m$ is equal to $\Delta f/2F_m$ and determining $\alpha$ from the relationship $\alpha = \pi \Delta f$.

4. The method of determining the growth constant of an unstable system comprising a chamber containing a burning sample of an unstable solid rocket propellant, the method comprising the steps of:
   introducing into the chamber an acoustic pressure driving wave having as a principal frequency component thereof the resonant frequency of the chamber;
   sensing the acoustic pressure in the chamber;
   reversing the phase of the driving wave when the chamber pressure reaches a predetermined maximum value thereby reducing the chamber pressure;
   again reversing the phase of the driving wave when the pressure has been reduced to a predetermined minimum value thereby allowing the chamber pressure to increase;
   determining the value of the growth constant from the measurement of the chamber pressure at the time of the phase reversals and from known properties of the chamber.

5. Apparatus for determining the acoustic admittance of the burning surface of a solid rocket propellant which comprises:
   a vented chamber in which to burn the propellant;
   a driving means adjacent to said chamber to introduce acoustic pressure waves into the chamber when said propellant is burned;
   transducer means adjacent to said chamber to sense the amplitude of the acoustic waves in the chamber;
   means connected to the transducer and the driving means to automatically control the frequency of the pressure waves introduced into the chamber by the driver means in response to the output of the transducer means; and means connected to the transducer output to give an output indication of the acoustic impedance of the burning surface of the propellant.

6. The apparatus of claim 5 where the chamber comprises:
   an elongated tubular member sealed at a first end and adapted to retain the burning propellant at the first end;
   the chamber having its exhaust vents disposed substantially symmetrically between the two ends of the tubular member;
   a second end of the chamber being closed by a diaphragm in direct contact with the driver means;
   the second end of the tubular member having thereat an opening for communication of the chamber pressure with the transducing means.

7. In combination, the apparatus of claim 6,
   a pressure vessel housing the vented chamber; and
   a ballast tank connected to the pressure vessel to prevent significant changes in the vessel pressure as a result of gas generated by the burning propellant.

8. The combination of claim 7 wherein the pressure vessel includes means to rigidly support the vented chamber.

9. The combination of claim 8 where the chamber exhaust vents are disposed asymmetrically with respect to the two ends of the tubular member.

10. The method of following time variation in the resonant frequency of an oscillating system which comprises:
    exciting the system with a driving signal having as a principal component thereof the resonant frequency of the system;
    measuring the amplitude of the system response;
    introducing into the system a test signal having as its principal components signals of frequencies $F \pm F_m$ where F is the frequency of the driving signal;
    detecting any modulation in the system response resulting from a shift in the system resonance curve which causes the frequencies $F \pm F_m$ no longer to be equally displaced from the resonant frequency; and
    adjusting the driving signal to minimize modulation in the system response.

11. Apparatus to determine properties of a time varying system comprising:
    driver means to couple energy into the system;
    transducer means to couple energy out of the system;

generator means connected to the driver means to generate a signal for exciting the system, the generator means comprising:

first oscillator means responsive to the transducer to generate a signal differing in frequency from that of the transducer output by a fixed predetermined amount;

a second oscillator generating a signal of a frequency equal to the fixed predetermined shift introduced by the first oscillator;

means to phase modulate the output of the second oscillator; and means connecting the phase modulator and the first oscillator to generate a signal to feed the driver means.

12. The apparatus of claim 11 wherein the connecting means comprises:

a phase shifter connected to the phase modulator;

a mixer connected to the phase shifter and to the first oscillator to generate a phase modulated signal whose carrier frequency equals the resonant frequency of the system and contains a phase angle equal to the phase shift introduced by the phase shifter means.

13. The apparatus of claim 12 where the first oscillator includes:

input means to generate a difference signal;

means connected to the input means and to the second oscillator to compare the difference signal and the output of the second oscillator;

a voltage controlled oscillator responsive to the degree of correspondence between the difference signal and the output of the second oscillator; and means to connect the output of the voltage controlled oscillator to the input means.

14. The system of claim 13 where means to phase modulate the output of the second oscillator comprises:

a third oscillator generating a signal of frequency $F_m$, and a phase modulator connected to the second and third oscillators; and where the index of modulation is sufficiently low that the mixer output signal may be represented as containing only a carrier frequency and two sideband signals displaced in frequency $F_m$ from the carrier frequency.

15. The apparatus of claim 14 wherein the modulation responsive means includes:

an amplitude modulation detector responsive to the difference, if any, between the displacement of the two sideband signals in the mixer output from the resonant frequency of the time varying system; and control means responsive to the output of the amplitude modulation detector to vary the phase shift introduced by the phase shifter to change the frequency of the driver signal whereby the driver signal accurately tracks changes in the resonant frequency of the time varying system.

16. The system of claim 15 further including a center-tapped transformer, the primary of which is connected to the output of the mixer, and the center-tapped secondary of which provides in-phase and out-of-phase versions of the mixer output; and means to selectively connect either of the transformer outputs to the driver means.

17. The system of claim 16 where the selective connecting means comprises:

means responsive to the amplitude of the transducer output to provide a switching signal when the transducer output reaches either of two predetermined signal levels; and means responsive to a switching signal representative of one of the predetermined levels to switch the in-phase output of the center-tapped transformer to the driving means;

and responsive to a switching signal representative of the other of the predetermined levels to switch the out-of-phase output of the transformer to the driving means.

18. The system of claim 17 further including means to periodically connect the in-phase output of the transformer to ground potential.

19. The system of claim 18 further including means responsive to a switching signal representative of the second of the predetermined levels to disconnect the output of the amplitude modulation detector from the control means.

20. The system of claim 19 further including means responsive to the mixer output and the transducer output to provide a direct indication of the amplitude of oscillation of the transducer output.

21. The system of claim 20 further including means responsive to the transducer output and to the output of the third oscillator to provide a direct indication of the bandwidth of the resonance of the time varying system.

22. The method of determining the bandwidth of the resonance of an oscillating system which comprises:

exciting the system with a driving signal having as a principal component thereof the resonant frequency of the system;

measuring the amplitude of the system response;

introducing into the system an additional signal having as its principal component frequencies $F \pm F_m$, where F is the frequency of the driving signal; and comparing the amplitude of the system response at the frequencies $F \pm F_m$ with the amplitude of the signals of those frequencies introduced into the system; and determining the value of the bandwidth from the fact that the ratio of the system response to the introduced signal at frequencies $F \pm F_m$ is equal to $\Delta f / 2F_m$.

23. The method of determining the growth constant of an unstable oscillating system comprising the steps of:

introducing into the system energy having as a principal frequency component thereof the resonant frequency of the oscillating system;

sensing the amplitude of the oscillations in the system;

reversing the phase of the driving energy when the amplitude of oscillation in the system reaches a predetermined maximum value thereby to reduce the amplitude;

again reversing the phase of the driving energy when an amplitude of oscillation has been reduced to a predetermined minimum value; and determining the value of the growth constant from the measurement of the amplitudes of oscillation in the system at the times of the phase reversals and from the known dynamic properties of the oscillating system.

24. The method of determining the damping constant of an oscillating system which comprises the steps of:

introducing into the system an acoustic pressure driving wave having as a principal frequency component thereof the resonant frequency of the oscillating system;

removing for a predetermined period the acoustic pressure driving wave introduced into the system;

measuring the pressure $P_0$ in the system at the time the input pressure is removed and the pressure $P_1$ in the system at the end of the predetermined period;

calculating the damping constant $\alpha$ according to the relationship $$\alpha = \frac{1}{t_1} \ln \frac{P_0}{P_1}$$

where $t_1$ is the length of the predetermined time period; $P_0$ is the pressure in the system at the time the input pressure is removed; and $P_1$ is the pressure in the system at the end of said predetermined period at a time $t_1$ later.

(References on following page)

References Cited

UNITED STATES PATENTS

| | | | |
|---|---|---|---|
| 2,483,829 | 10/1949 | Hershberger | 73—24 |
| 2,865,196 | 12/1958 | Bordenave et al. | 73—67.6 |
| 3,019,387 | 1/1962 | Rowe | 73—67.2 XR |
| 3,020,750 | 2/1962 | Briscoe | 73—67.2 |
| 3,120,750 | 2/1964 | Root | 73—24 |
| 3,151,487 | 10/1964 | Schuck | 73—517 |

OTHER REFERENCES

An article from National Bureau of Standards Technical News Bulletin, volume 36, No. 12, pp. 186–8, December 1952.

JAMES J. GILL, *Primary Examiner.*